No. 800,598. PATENTED SEPT. 26, 1905.
F. A. SEIBERLING & U. P. SMITH.
MACHINE FOR CUTTING FABRICS INTO BLANKS AND UNITING THE SAME.
APPLICATION FILED SEPT. 9, 1903.

Witnesses:
C. D. Kesler,
James L. Norris, Jr.

Inventors
Frank A. Seiberling
Uzziel P. Smith
By James L. Norris.
Atty.

No. 800,598. PATENTED SEPT. 26, 1905.
F. A. SEIBERLING & U. P. SMITH.
MACHINE FOR CUTTING FABRICS INTO BLANKS AND UNITING THE SAME.
APPLICATION FILED SEPT. 9, 1903.

Witnesses
C. J. Kesler
James L. Norris

Inventors
Frank A. Seiberling
Uzziel P. Smith
By James L. Norris
Atty.

No. 800,598. PATENTED SEPT. 26, 1905.
F. A. SEIBERLING & U. P. SMITH.
MACHINE FOR CUTTING FABRICS INTO BLANKS AND UNITING THE SAME.
APPLICATION FILED SEPT. 9, 1903.

Witnesses:
C. D. Kesler
James L. Norris, Jr.

Inventors
Frank A. Seiberling
Uzziel P. Smith
By James L. Norris
Atty.

UNITED STATES PATENT OFFICE.

FRANK A. SEIBERLING AND UZZIEL P. SMITH, OF AKRON, OHIO.

MACHINE FOR CUTTING FABRICS INTO BLANKS AND UNITING THE SAME.

No. 800,598.          Specification of Letters Patent.          Patented Sept. 26, 1905.

Original application filed April 15, 1903, Serial No. 152,758. Divided and this application filed September 9, 1903. Serial No. 172,491.

*To all whom it may concern:*

Be it known that we, FRANK A. SEIBERLING and UZZIEL P. SMITH, citizens of the United States, residing at Akron, in the county of Summit and State of Ohio, have invented new and useful Improvements in Machines for Cutting Fabrics into Blanks and Uniting the Same, of which the following is a specification.

This invention relates to machines for cutting fabric into blanks and uniting the same.

The object of the invention is in a ready, simple, thoroughly feasible, practical, and uniform manner to cut frictioned fabric, such as duck or muslin, on the bias and into blanks of any desired width; to effect connection or adhesion of the successive blanks with each other; to present a continuous sheet of any desired length; to effect rapid and accurate cutting of the sheet thus formed into strips of uniform width, and, finally, to effect winding of the strips onto spools and at the same time to interpose a suitable material between the plies thereof to prevent adhesion.

A further object is to effect automatic measurement of the blanks, automatic stopping of the machine when a length of fabric sufficient to form a blank has been measured, and automatic stopping of the machine when one severed blank is brought into position to be united with the preceding blank.

The invention embodies, generally stated, a table or surface comprising two parts preferably approximately at an angle of forty-five degrees to each other; means for feeding a length of frictioned fabric over the straight or on-take portion of the table; means for severing the selvage of the fabric thus fed; means for stopping the machine when a predetermined length of the fabric has been unwound or, in other words, when the bias end thereof comes opposite the angular or off-take portion of the table; means for severing the length thus fed; means for assembling it with a preceding length; means for withdrawing the severed length from the table and winding it upon a spool or reel preferably disposed at an angle of forty-five degrees to the straight portion of the table; means for unwinding the bias sheet formed by the preceding operations from the spool and for cutting it into strips of predetermined widths, and means for winding the strips thus formed upon spools and at the same time interposing fabric between the plies thereof to prevent adhesion.

With the above and other objects in view, as will appear as the nature of the invention is better understood, the same consists in the novel construction and combination of parts of a machine for cutting fabric, whether frictioned or otherwise, on the bias, as will be hereinafter fully described and claimed.

The principal use to which the machine of this invention is adapted is the cutting of duck or muslin to be used in the construction of pneumatic or other tires constructed in part of such fabric. The cutting of this fabric has heretofore been mainly accomplished by hand, and the resulting output has been uneven, resulting in great waste by spoilage. To present a first-class tire, it is an absolute requisite that the fabric strips be of uniform width. Otherwise the laps which hold the tire together will be narrow in some places and wide in others, the weakest or narrowest portion of the lap determining the strength of the tire. With the machine of the present invention the above objectionable features are positively obviated and strips of uniform and any desired width are produced at all times with rapidity and certainty.

The material employed for making the tires may be cotton-duck, which is principally used, or muslin. This fabric is generally woven about sixty inches wide and when cut on the bias will make strips long enough to encircle an ordinary bicycle-tire. This fabric is first prepared for the purpose by passing it between calender-rollers covered with a rubber compound which is pressed into the fabric and also covers its surface, so that the cloth when it leaves the rolls will stick together with nearly the tenacity of the rubber compound itself, and to obviate this a layer of common muslin or cheap cotton cloth is included between the plies of the treated fabric, which is commonly known as "frictioned fabric," the roll thus presented being of alternate plies of frictioned fabric and cotton or muslin. By thus interposing the muslin between the plies of the frictioned fabric it may be readily unrolled for the purpose of being cut, which would be very difficult if otherwise presented. The employment of frictioned fabric obviates the necessity of sewing together the edges of the sheet in the production of the tire, and when the tire is vulcanized its edges will become more firmly assembled or secured together than could possibly be accomplished by ordinary sewing. By the procedure defined much material that otherwise would be wasted is saved and the floor-space required in the manufacture of tires is greatly reduced in area. In the making of a tire where the strips are cut by hand or by a machine in separate detached lengths it is generally necessary to tear off from one to three inches from the end of each strip of fabric to obtain the proper lap, and the material thus separated is worthless and is a waste product, and in a factory manufacturing a large number of tires this waste amounts to many yards in the course of a day. If the strips are united by proper lap-forming as they are cut and formed into one continuous sheet rolled upon a spool in the manner hereinafter described, the waste of material above referred to is obviated, as the operator tears off from the continuous sheet from time to time the precise length he requires in making the tire.

The saving in floor-space required in carrying out the procedure hereinafter defined amounts to at least seventy-five per cent. less than that required where the strips are detached as heretofore, as in this case the strips have to be laid between muslin or cotton cloth on boards from seven to eight feet in length supported near the operator upon tables or stands of any suitable character. Under the present procedure a row of suspended spools behind or above the operator is the only space required to contain all of the stock of every kind that is employed in making a complete tire, and the employment of long tables in the construction-room entirely obviated. The item in saving in floor-space is very important and one that will be duly appreciated by those familiar with the present mode of handling stock. Strips of any width may also be cut with the weave of the goods, if desired, by the machine constituting the subject-matter of this invention and from any desired material.

Other and salient objects and features of the invention will hereinafter be fully described.

In the accompanying drawings, forming a part of this specification, in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings,
Fig. 1ᵃ is a similar view of the front portion of the machine or that upon which the fabric is first fed and where the selvage is removed and the bias cut is made.

The specific form of cutting mechanism herein shown and described is not claimed in this application, as it forms the subject-matter of an application filed by us April 15, 1903, Serial No. 152,758.

The machine of this invention embodies in part a table or operating-surface comprising an on-take portion 1 and an off-take portion 2, the latter being disposed at an angle to the former, preferably of about forty-five degrees, this being usually the angle on which bias cuts are made and being either rigid or adjustable with relation to the on-take portion. The table, which may be constructed of any material best suited to the purpose, is supported upon uprights 3, of which there may be any preferred number connected by cross-pieces 4.

Figure 5:
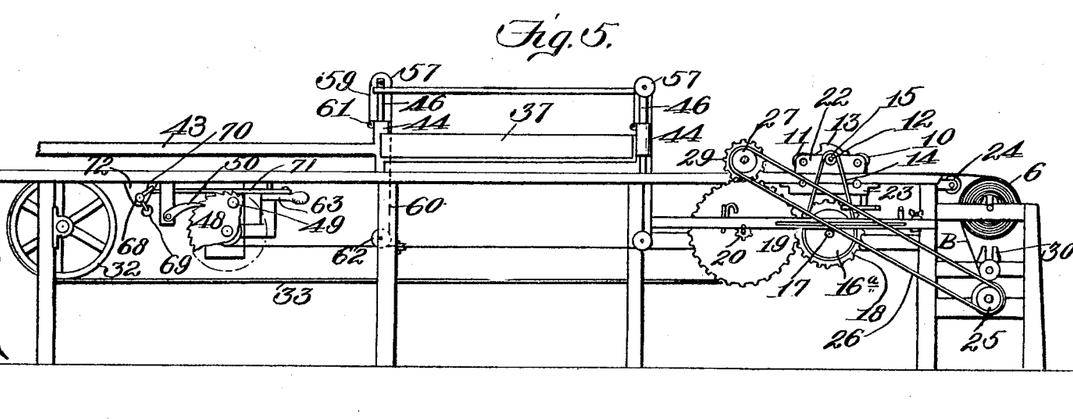
Fig. 5 is a view in side elevation of the rear portion of the machine.

At the front end of the machine, or that from which the operation starts, there is mounted a shaft 5, which, as shown in Fig. 5, works in open-ended bearings 6 to permit removal when required. This shaft carries a core or drum 7, upon which is wound the roll of fabric A, the same having been properly frictioned in the manner before described and the plies thereof being interposed by material from off a drum 8, the shaft 9 of which is journaled in suitable bearings upon the frame. The fabric is fed through the machine by a plurality of pairs of feed-rollers 10 and 11, disposed on opposite sides of a shaft 12, at each end of which is arranged a cutter 13 of any preferred style, which are provided for removing the selvage of the fabric. The cutter-shaft 12 drives a belt 14, which passes around a pulley 15 on the end of the shaft and around a pair of pulleys 16 and 16ª, carried by a shaft 17, the shaft having mounted upon it a gear 18, which meshes with a gear 19, mounted upon a shaft 20. The shaft 12 is positively driven by a belt (not shown) which passes around a pulley 21. (Shown in Fig. 1ª.) The pulley 16 is fast on the shaft 17 and the pulley 16ª loose thereon, and the belt 14 is automatically shifted from one pulley to another by means presently to be described. It will be understood, of course, that the pulley 15 is to be of a width equal to the combined widths of the two pulleys above named in order to permit shifting movement.

Figure 4:
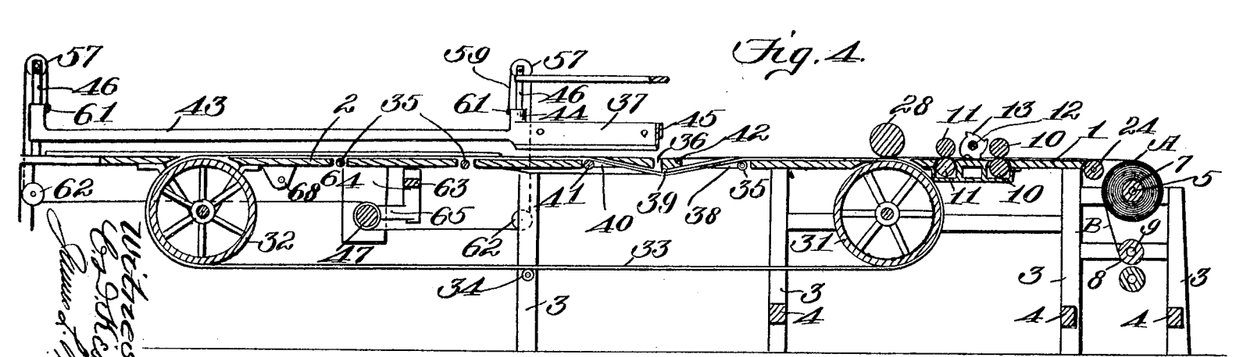
Fig. 4 is a vertical longitudinal section taken on the line 4 4 of Fig. 1ᵃ.

The series of feed-rolls 10 and 11 may be supported in any preferred manner, and in this instance, as shown in Fig. 5, their shafts are journaled in brackets 22 and 23, respectively, the brackets 22 being disposed upon the upper side of the frame or table and the brackets 23 on the under side thereof. To facilitate feeding of the sheet of frictioned fabric on the table, a roller or drum 24 is provided, as clearly shown in Figs. 4 and 5.

The drum 8, upon which is wound the material interposed between the plies of the frictioned fabric, is driven from a drum or roller 25, (clearly shown in Figs. 4 and 5,) through the medium of a belt 26, which engages a pulley 27 on a feed-roller 28, the latter roller carrying a gear 29, which meshes with the gear 19. The shaft 9 of the drum or roller 8 works in vertical guides 30, Figs. 4 and 5, in order to permit it to rise as its diameter is increased by the plies of the material B. The drum 25 is driven at a uniform rate of speed and is timed to move in exact ratio to the rate of movement of the drum 7, thus to insure that the material B will be properly removed from between the frictioned fabric and stored.

The shaft 20 carries a drum 31, disposed beneath the feed-roller 28, and at the opposite end of the ontake portion of the table is mounted a drum 32, similar to the drum 31 and of the same diameter, and around these two drums passes a belt 33, the lower member of which is supported against sagging by a roller or rollers 34 and the upper member by rollers 35. The table above the drum 31 is cut away to permit the belt to be disposed upon the upper face thereof, thus to bring it into coactive relation with the feed-roller 28, which operates to draw the frictioned fabric between the cutters 13.

At a point approximately midway of the length of the ontake portion of the table there is a diagonal slot 36, into which the knife 37 enters in cutting the fabric on the bias, and in order to protect the belt 33 from being severed at a point in front and rear of the knife it is passed downward through a slot 38 of the table, thence around a roller 39, and thence up and outward through a slot 40 onto the top of the table, a roller 41 being provided at the latter point to keep the belt from rubbing or grinding against the edge or wall of the slot 40. In order that the knife shall be thoroughly effective for severing the goods, there is a metallic shearing edge 42 provided, against which the inner face of the knife closely impinges, and this element performs the function in the manner well known to such devices.

Figures 6, 7, 8, 9:
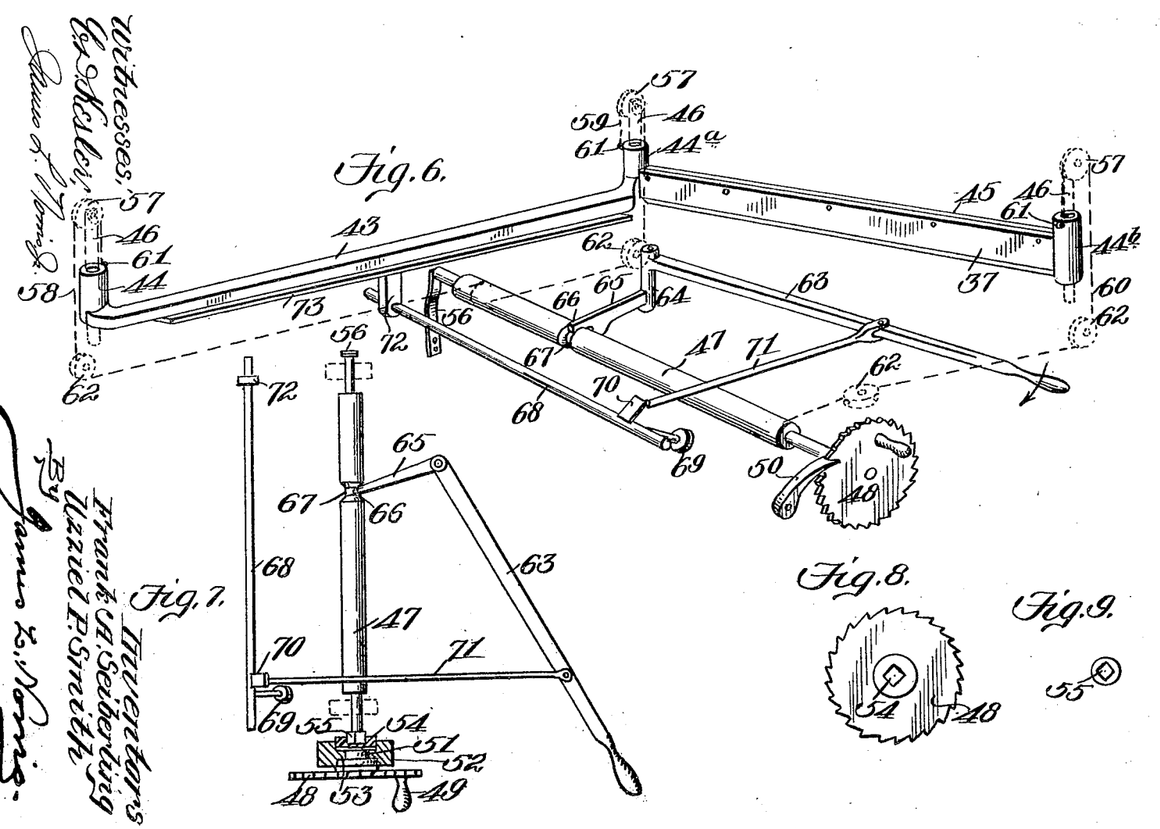
Fig. 6 is a perspective detail view of a combined hammer and knife which operates first to sever the fabric on the bias and then unite the severed blank with a preceding blank.
Fig. 7 is a view in plan, partly in section, of a part of the portion of the actuating mechanism shown in Fig. 6.
Fig. 8 is a view in elevation taken from the opposite side of the ratchet-wheel shown in Fig. 6.
Fig. 9 is an end view of a shaft to engage a socket in the gear-wheel shown in Figs. 6 and 8.

The knife 37, as also the hammer or fabric-clamping element 43, is carried by a frame comprising three tubular guides 44, 44ª, and 44ᵇ, Fig. 6, the hammer serving to connect the guides 44 and 44ª and a bar 45 to connect the guide 44ª with the guide 44ᵇ, the knife being riveted or otherwise secured to this bar, as clearly shown in Fig. 6. If preferred, the hammer and bar may be formed integral with the guides or may be suitably secured thereto. The guides are mounted for vertical reciprocatory movement upon standards or pillars 46, which are suitably secured to the frame of the machine, as shown in Figs. 1ª–6.

The means for raising the hammer and knife above the table, for holding them in this elevated position, and for releasing them at the proper time is clearly shown in Fig. 6 and comprises a shaft 47, the terminals of which are reduced and are mounted in suitable bearings in the frame of the machine. The shaft 47 is adapted for horizontal reciprocatory movement, the movement of the shaft in one direction operating to release it from engagement with the lifting mechanism of the hammer and knife and movement in the opposite direction serving to bring it again into engagement with its rotating mechanism. To effect lifting of the hammer and knife and to hold it raised, there is provided a ratchet-wheel 48, furnished with a handle 49, a pawl 50 being provided to lock the wheel against rotation. The ratchet-wheel is provided with a hub 51, (clearly shown in Fig. 7,) which is mounted in a bearing 52, the said hub being provided with a circular recess to engage a rib 53 in the bearing, thus to hold it against endwise movement. The inner end of the hub is provided with a polygonal socket 54 to engage a polygonal head 55 on the shaft 47, by which arrangement it will be seen that upon turning the ratchet-wheel the shaft will be at the same time rotated. As a means for holding the head 55 in the socket of the hub a spring 56 is provided, which engages the reduced terminal of the shaft opposite the ratchet-wheel, as clearly shown in Figs. 6 and 7. Upon each of the standards 46 and at the upper end thereof there is mounted a grooved sheave 57, around each of which passes a flexible connector, as a cord or chain 58, 59, and 60, respectively, one end of each of the connectors being secured to an eye or staple 61 on the guide and the other end to the shaft 47, the intermediate portions of the connectors being guided by grooved sheaves 62, suitably disposed to hold the connectors in proper position. It will be seen from the arrangement of connectors and sheaves exhibited that upon turning the ratchet-wheel 48 the connectors will be wound upon the shaft or drum 47, and thus effect the lifting of the hammer and knife, the pawl 50 operating to hold the parts at the proper elevation. Under this arrangement the force of the blow of the hammer or knife will be regulated at will, so that absolute certainty of operation will be secured.

The means for releasing the hammer and knife to permit them to drop comprises a lever 63, fulcrumed at its inner end to a stud or boss 64, mounted for rotary movement beneath the table, said stud being provided with an arm 65, having a forked or yoked end 66 to work in a groove 67 in the drum 47. In conjunction with this mechanism there is a shaft 68, having a counterweight or counterweights 69 to hold the shaft normally in the position shown in Fig. 6, the said shaft being provided with a toe or projection 70 to be engaged by a hinged arm 71, carried by the lever 63. The shaft 68 also carries an arm 72, adapted to engage with the under side of a hinged apron 73, arranged beneath the hammer, the function of the apron being to hold the edge of a preceding severed blank raised to permit a succeeding blank to pass thereunder to form the laps to present a continuous sheet of united blanks of any desired length. To release the hammer and the knife, the lever 63 is first moved in the direction shown by the arrow in Fig. 6, and this movement will rock the shaft 68 and move the arm 72 out of engagement with the apron 73 and allow it to drop and overlap the edge of a preceding blank upon a succeeding one, as will be readily understood by reference to Fig. 2. This movement of the lever also reciprocates the shaft 47 and moves the polygonal head 55 out of engagement with the socket 54, thereby releasing the shaft from its holding means, whereupon the weight of the knife and hammer will cause them rapidly to descend, sever a fresh blank from the sheet of frictioned fabric, and at the same time firmly unite the overlapped edges of the two blanks. As soon as the lever 63 is released the spring 56 operates to force the shaft 47 back to its normal position, thereby bringing the head 55 in engagement with the socket and returning the lever 63 back to the position first occupied. As soon as the parts are in this position the ratchet-wheel 48 will be turned to elevate the knife and the hammer to the desired height, where they are locked in the manner before described.

Figures 10, 11:
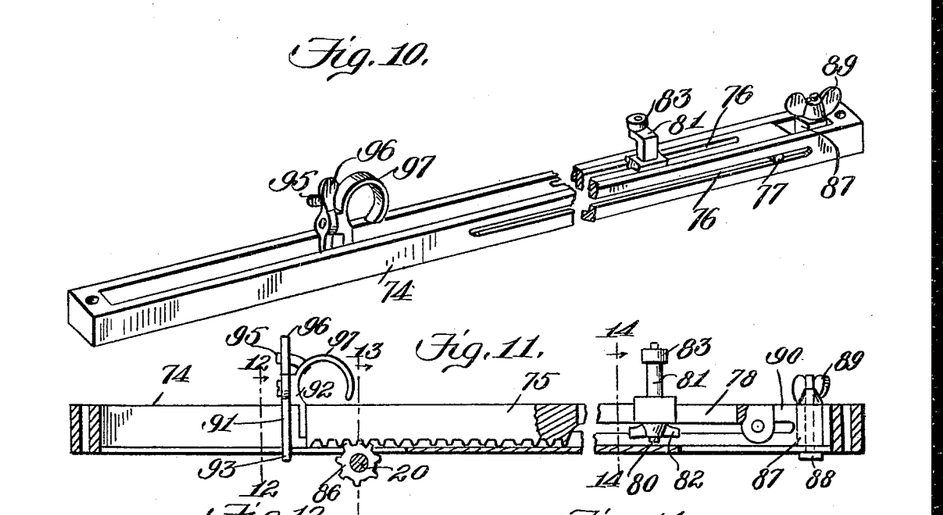
Fig. 10 is a perspective detail view, partly broken away, of the automatic mechanism for stopping the machine when a predetermined length of fabric has been fed upon the table.
Fig. 11 is a vertical longitudinal section through Fig. 10, showing the internal construction thereof.
Figure 12:
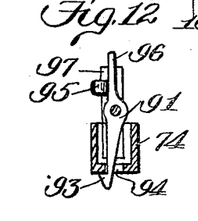
Fig. 12 is a transverse sectional view taken on the line 12 12 of Fig. 11 and looking in the direction of the arrow thereon.
Figure 13:
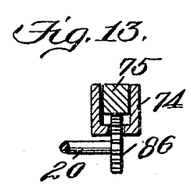
Fig. 13 is a transverse section taken on the line 13 13 of Fig. 11.
Figure 14:
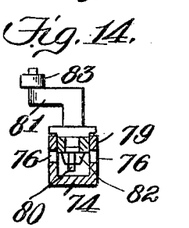
Fig. 14 is a transverse section taken on the line 14 14 of Fig. 11 and looking in the direction of the arrow thereon.

As stated at the outset of the specification, one of the objects of this invention is to provide means for stopping the machine when a predetermined length of fabric has been unwound or, in other words, when the bias end thereof comes opposite the offtake portion of the table or under the hammer. The means for effecting this result is clearly shown in Figs. 10 and 11 and comprises a hollow guide 74 (shown in detail in Fig. 10) and a rack-bar 75, pivotally mounted therein. The guide is provided throughout a portion of its length and in each side with a longitudinal slot 76, in which works a pin 77, carried by the rear portion of the rack-bar, this arrangement permitting the said bar to have a swinging movement within the guide. The rear portion of the rack-bar is provided with a flat shank 78, having a longitudinal slot 79, through which passes the threaded shank 80 of a cranked arm 81, and a thumb-screw 82, turned upon the threaded shank, operating to hold the arm at the desired adjustment within the shank 78. The arm 81 and which constitutes a trip device carries on its horizontal member a roller 83, which projects inward beyond the side of the guide and is designed to engage with a belt-shifter 84, carried by a bracket 85, secured to the side of the frame, as clearly shown in Fig. 1ª. The belt-shifter coacts with the belt 14, as clearly shown in Fig. 1ª, and as this belt controls the movement of the feeding mechanism it will be seen that when the arm 81 contacts with the head of the shifter the belt will be automatically thrown from the tight to the loose pulley, and thus stop the machine. This automatic shifting of the belt is effected through the medium of the rack-bar 75, which meshes with a pinion 86 on the shaft 20, and the relative proportions between the gears 19 and the pinion 86 is such that by the time the rack-bar has been moved to the point where the machine is stopped the predetermined length of frictioned fabric has been fed onto the table. As just set forth, the belt-shifter is automatically operated in one direction. During such automatic movement it serves to positively shift the belt 14 from the pulley 16 onto the pulley 16ª. It may be returned by hand or otherwise, as may be desired, and during the return movement of the belt-shifter it causes movement of the belt from the pulley 16ª to the pulley 16. In order that the rack-bar may always be readjusted to cause it accurately to operate the shifting mechanism, thus to cause the severed blanks to be of exactly the same length, there is an adjustable stop or abutment 87 provided, which is locked in the guide by a bolt 88 and thumb-nut 89, this abutment being engaged by a rearward extension 90 on the shank 78. In addition to performing this function this abutment may be employed to vary the length of the blank severed—that is, to make it longer or shorter, as may be preferred—it beng seen that by moving the abutment toward the rack-bar the length of the blank will be shortened and by moving it away from the rack-bar it will be lengthened. To prevent the rack-bar from lifting when being moved forward, and thus thrown out of engagement with the pinion 86, a locking device is employed, which is shown in detail in Fig. 12 and comprises an arm 91, pivoted to an upstanding projection 92 on the front end of the rack-bar, the lower end of the arm being provided with an angular head 93 to project through a slot 94 in the lower side of the guide 74 and to interlock with the under wall thereof, a spring 95, carried by the projection 92, operating normally to hold the arm in the position shown in Fig. 12. The arm is fulcrumed approximately intermediate of its ends, and its upper extremity constitutes a finger-hold 96, by which to permit of the arm being rocked to throw the head out of engagement with the guide, thus allowing the rack-bar to be lifted and projected back to its normal position. The projection 92 is formed with a curved finger-hold 97 to facilitate the lifting of the rack-bar. From the foregoing description it will be seen that the action of this automatic belt-shifter is positive, and by means of the adjustment of the tripping element and of the stop 87 the feeding of a predetermined length of fabric may be accomplished with positive accuracy. It will be understood that each time a blank is severed from the roll of frictioned fabric the machine is stopped and that the rack-bar has to be lifted and pushed back to its normal position to be again in position to perform its function.

Figure 2:
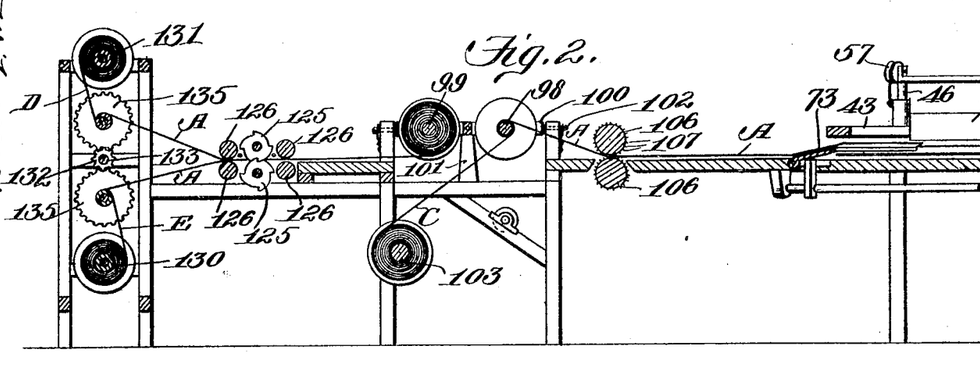
Fig. 2 is a view in vertical longitudinal section through a portion of the machine, taken on the line 2 2 of Fig. 1.

The mechanism thus far described comprehends the means for feeding the strip of frictioned fabric from the roll onto the table, the winding up of the material employed to prevent adhesion of the plies of the fabric, the cutting of the fabric into predetermined lengths, and the uniting of the bias-cut blanks to form a continuous sheet. As the successive blanks are united by the adhesion between the lapped portions these blanks are wound upon one of a pair of reels 98 or 99, said reels being mounted upon a swinging frame. (Clearly shown in Figs. 2 and 3.) This frame comprises two arms 100, fulcrumed upon standards 101, arranged on opposite sides of the machine-frame, suitable bolts or latches 102 being provided to prevent the frame from tilting when the machine is in operation. The object of providing two of the reels is to obviate the necessity of stoppage of the machine when a reel is empty, as under the arrangement shown while one reel is being emptied of the fabric the other reel is being filled. As shown in Fig. 2, the bolts or latches 102 project through openings in the standards of the machine and enter sockets in the swinging frame; but it is to be understood that any other appropriate form of locking device may be employed for the purpose without departing from the spirit of the invention.

As shown in Fig. 2, the reel 98 is receiving the sheet of bias-cut fabric and the reel 99 is having the fabric fed therefrom. As the fabric is wound upon the reel 98 it is interposed by a sheet of suitable material C, carried by a reel 103, the shaft 104 of the reel, as shown in Fig. 2, being mounted in open-ended bearings 105 to permit of an empty reel being removed for the purpose of replacing it with a full one. To effect certain feeding of the bias sheet, feed-rollers 106 are employed, the peripheries of which are provided with studs or projections 107 to bite into the fabric without puncturing it for the purpose described. The feed-rollers 106 may or may not be geared together, as may be found best. When not geared together, as the fabric is drawn between them they are caused to rotate, and the speed of their rotation will always depend upon the rate of speed of the canvas as it passes between them. This is the best manner of adjusting the stopping mechanism, as the spool receiving the bias fabric is constantly growing larger or increasing in diameter, and consequently dependence must be placed upon the length of the cloth passing between the rollers to ascertain just when the machine must be stopped to leave the proper lap at the apron.

Figure 1:
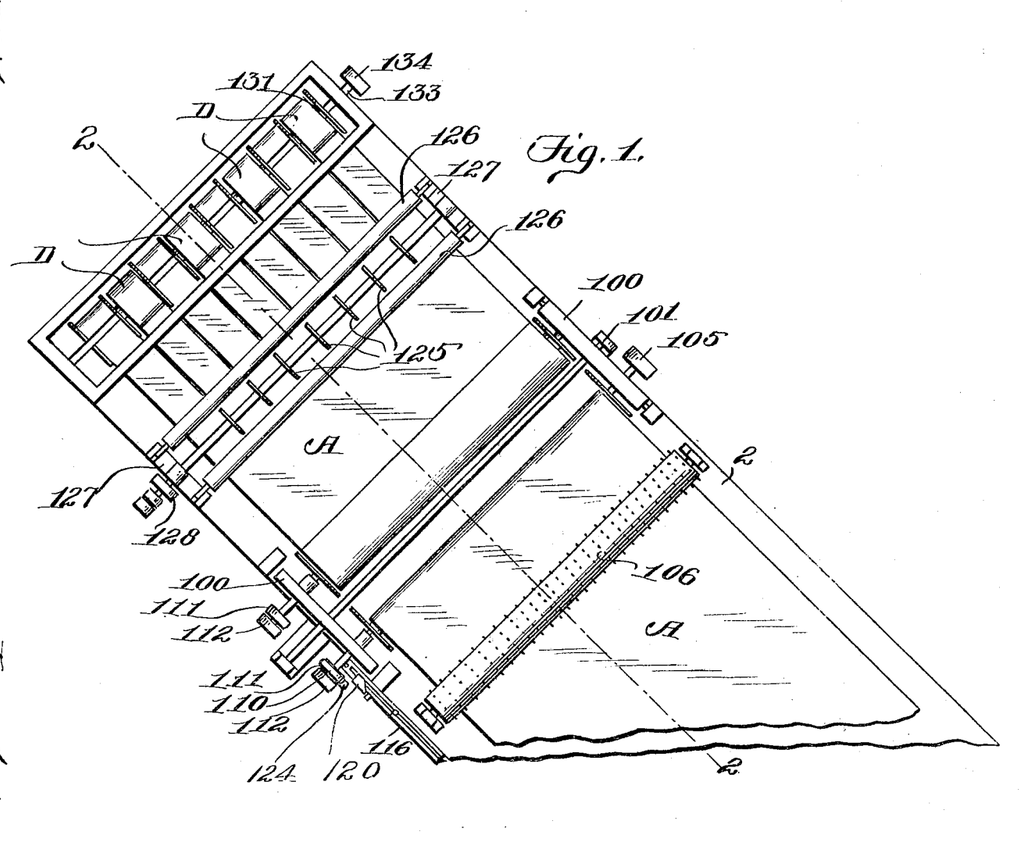
Figure 1 is a view in plan of the rear portion of the machine or that where the fabric is cut into narrow strips.
Figure 1A:
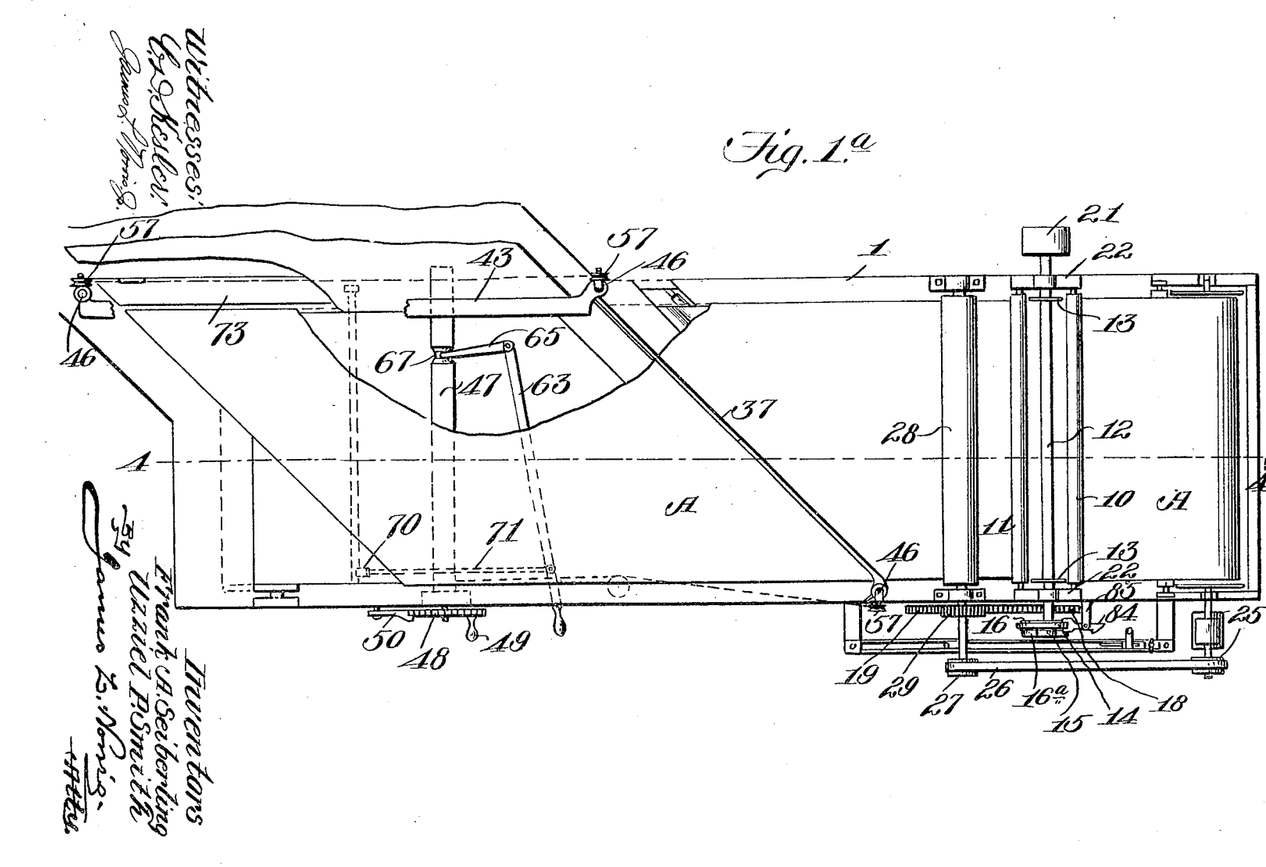
Figure 3:
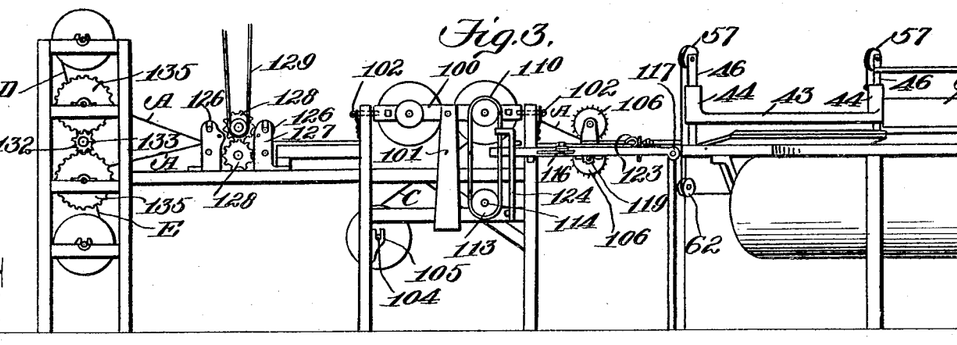
Fig. 3 is a view in side elevation of the machine.
Figure 15:
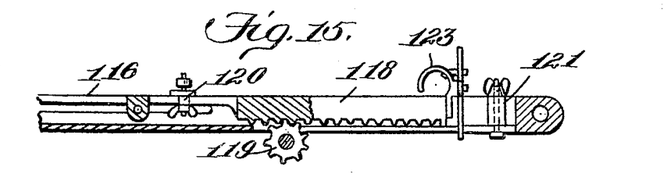
Fig. 15 is a view in vertical longitudinal section of the automatic mechanism for stopping the machine when a severed blank has been moved to position to be united with a preceding blank.
Figure 16:
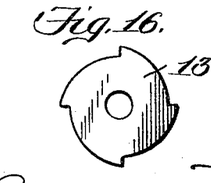
Fig. 16 is a view in elevation of one of the knives or cutters used in severing the fabric.
Figures 17, 18, 19, 20, 21, 22:
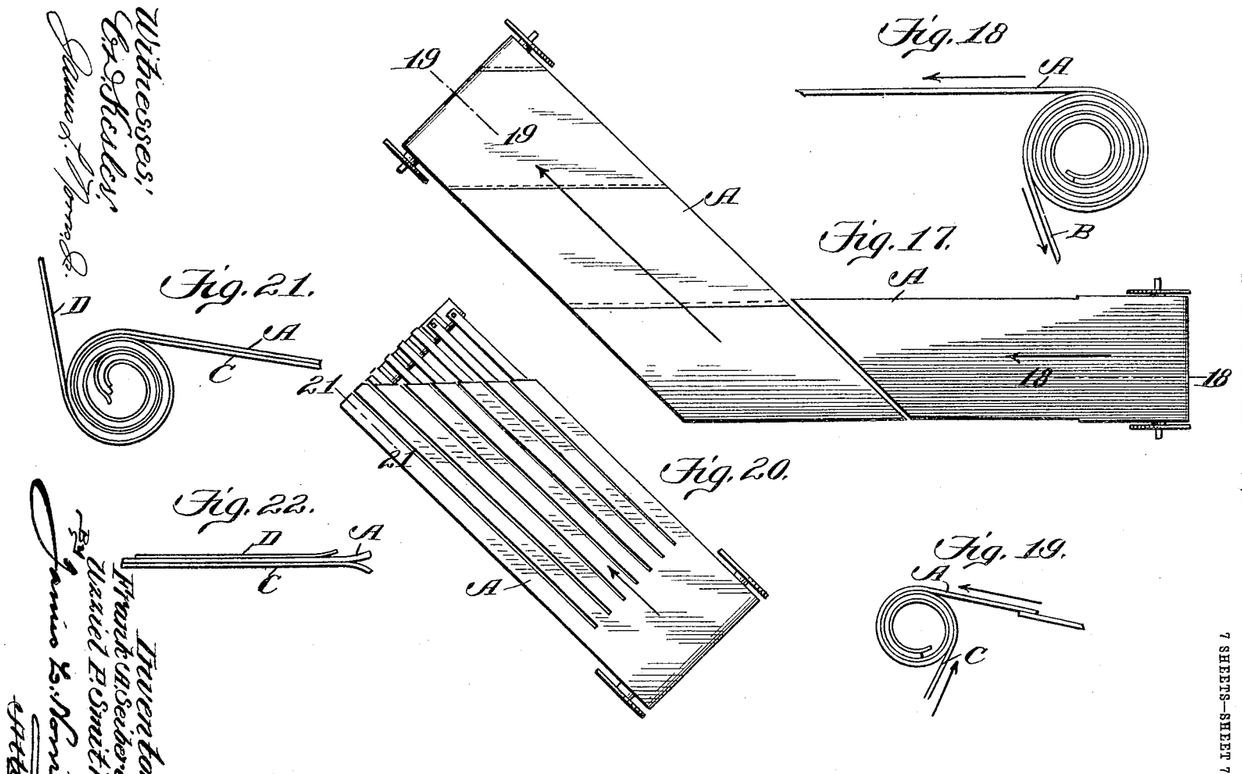
Fig. 17 is a view in plan exhibiting the direction of movement of the fabric from the time it first enters the machine until it is severed into blanks, united, and wound upon a spool or reel.
Fig. 18 is a vertical sectional view taken on the line 18 18 of Fig. 17, exhibiting the roll of frictioned fabric and the manner in which the plies of the same are prevented from adhering.
Fig. 19 is a vertical sectional view taken on the line 19 19 of Fig. 17, showing the lap-joint of the blanks and also the interposed ply of muslin or other fabric to prevent the plies of the frictioned fabric adhering together.
Fig. 20 is a view in plan exhibiting the sheet of frictioned fabric severed into strips.
Fig. 21 is a longitudinal sectional view taken on the line 21 21 of Fig. 20, showing the manner of disposing two plies of muslin between the plies of the frictioned fabric to prevent adhesion.
Fig. 22 is a view in elevation showing a length of the completed strip as it is furnished to the user.

The reel 98 is driven by a belt 110, which is adapted to engage either a tight or a loose pulley 111 or 112 on the shaft of the reel, it being understood that the reel 99 is provided with similar pulleys, as shown in Fig. 1. This belt engages a pulley 113 of a width equal to the two pulleys above mentioned, the said pulley 113 being carried by a shaft 114, having on its opposite end a pulley 115, which is driven by any suitable source of power, as by a belt. (Not shown.) In order to stop the rotation of the reel 98 when the bias sheet of fabric has been moved forward the proper distance to form the lap over the succeeding sheet, automatic means is provided for this purpose which is in construction the same as that described for stopping the feed of the fabric to the ontake portion of the table, as already described. This means, as shown in detail in Fig. 15, comprises a guide 116, pivoted at 117 to the frame of the machine. In this guide is mounted a rack-bar 118 to mesh with a pinion 119, carried by the shaft of the lower feed-roller 106. This shiftable device is provided with the adjustable tripping device 120, with the adjustable abutment 121, with the finger-piece 123 for lifting the rack-bar to draw it back to its normal or starting position. A belt-shifter 124 is provided which engages the belt 110, and this shifter is automatically thrown to bring the belt from the tight to the loose pulley when the tripping device 120 contacts with it in a manner that will be readily understood. It will be seen that as the sheet of bias fabric is fed forward after its free end has been associated with the succeeding blank as soon as the tripping device 120 contacts with the shifter 124 the belt 110 will be shifted and the drawing of the fabric through the machine will be stopped, and these parts are so timed as to cause the lapped portion on the apron 73 always to project exactly the same distance beyond said apron, thus to form lap-joints of exactly the same width. By the time the reel 99 is emptied of the bias fabric the reel 98 will have been filled, and to bring the reel 98 into the position occupied by the reel 99 the locking devices 102 are moved out of engagement with the swinging frame, the belt 110 is thrown out of engagement with the pulley 112, and the frame is reversed, is again locked in horizontal position, and the belt 112 brought into engagement with the pulley of the reel 99. The bias fabric having been now formed into a continuous sheet or strip, the operation of cutting it into strips of any desired length is begun, and this is accomplished by two gangs of cutters 125, which are by preference adjustable on their supporting-shafts in order to vary the width of the strips, as desired, there being provided pairs of feed-rollers 126 on each side of the cutters. The shafts of the cutters, as also the feed-rollers, are mounted in brackets 127, secured to the frame of the machine, and the bearings for the upper pair of feed-rollers are by preference open-ended to permit of their being lifted out when the fabric is brought between the cutters. As shown in Fig. 3, each cutter-shaft carries a gear 128, which intermeshes with each other, thus to transmit motion from the driven one, which in this instance is the upper shaft, the latter being rotated through the medium of a belt 129, driven from a suitable source of power. (Not necessary to be shown.) When the bias fabric passes between the cutters, it has only one sheet of material C included between its plies, and as each strip is wound upon an individual spool and as one strip is wound upon a spool disposed below the plane of the cutters and the other on a spool above the plane thereof it follows that one sticky or frictioned side of the fabric will be exposed, and in order to prevent adhesion thereof two additional reels 130 and 131, of muslin or the like, are employed, the fabric D from the reel 131 being included between the plies of the fabric of the spools above the plane of the cutter and the fabric E from the reel 130 being included between the plies of fabric below the plane of the cutters. Any suitable means may be employed for driving the spools, and in this instance it consists of a pinion 132, mounted upon a shaft 133, carrying at one end a pulley 134, which is driven from any suitable source of power. Each of the shafts carrying the spools upon which the strips are wound carries a gear 135, which meshes with the pinion, and are thereby driven in a manner that will be readily understood. After the strips pass the cutters the free ends thereof are attached to flexible strips connected with the spools, which operate to carry the strips around the same.

The form of cutters herein shown has been found thoroughly adapted for the purpose designed; but it is to be understood that other forms may be employed and still be within the scope of the invention.

It will be seen from the foregoing description that by the arrangement and combination of parts of the machine herein shown accurate and positive cutting of a sheet of fabric first on the bias and then into blanks of any desired length, then uniting all of these blanks into a continuous sheet, and the cutting of this sheet into strips of any desired size is accomplished in a manner that is simple, thoroughly feasible, and practical, and that for accuracy and rapidity the arrangement shown is thoroughly adapted for the purposes designed.

Having thus described the invention, what we claim is—

1. A machine of the class described, comprising an ontake-table, an offtake-table, means for feeding a sheet of fabric over the ontake-table toward the offtake-table, automatically-operating mechanism for stopping the feed of the fabric when a predetermined length thereof has been fed, means for holding the free end of a preceding blank elevated to permit a succeeding blank to pass thereunder to form a lap, and means to sever the blank and simultaneously therewith to form a lap-joint.

2. A machine of the class described, comprising an ontake-table, an offtake-table disposed at an angle thereto, means for feeding a sheet of fabric over the ontake-table toward the offtake-table, automatically-operating mechanism for stopping the feed of the fabric when a predetermined length thereof has been fed, means for holding the free end of a preceding blank elevated to permit a succeeding blank to pass thereunder to form a lap, and means for severing the blank and simultaneously therewith to form a lap-joint.

3. A machine of the class described, comprising a table, means for feeding a sheet of fabric thereover, means for severing the selvage of the fabric, a knife disposed diagonally of the table for cutting the fabric on the bias, a hammer or impact device for connecting a severed blank with a preceding one, and means for releasing the knife and the hammer at the proper time.

4. In a machine of the class described, a combined cutter and hammer comprising a frame mounted for vertical movement, a shaft or drum, flexible connections between the shaft and drum and the frame, and means for rotating the shaft or drum to raise the hammer and knife to the desired height and for holding it elevated.

5. In a machine of the class described, the combination with a hammer and knife carrying frame, of an apron disposed beneath the hammer, a horizontally-movable shaft and means for rotating it, flexible connections between the shaft and the frame, a shaft-carrying means for holding the apron normally raised above the plane of the table, and a lever provided with means to shift the first-named shaft laterally thus to remove it from engagement with its actuating mechanism, and to rock the shaft to release the apron.

6. In a machine of the class described, a hammer and knife carrying frame, the knife being disposed at an angle to the hammer, an apron, a longitudinally-shiftable spring-pressed shaft disposed beneath the table and having its outer end provided with a polygonal head, a ratchet-wheel having a socket to be engaged by the said head, a pawl for holding the ratchet-wheel against rotation, flexible means connecting the frame and the shaft, a shaft carrying an arm to hold the apron normally elevated above the plane of the table, and a lever provided with means to shift the first-named shaft laterally to throw the head out of engagement with the socket of the ratchet-wheel thus to permit the frame to drop and at the same time to rock the last-named shaft to throw the arm out of engagement with the apron.

7. In a machine of the class described, the combination of means for cutting a sheet of fabric on the bias and into blanks of predetermined lengths, means for uniting the blanks to present a continuous sheet of fabric, means for cutting the bias sheet into strips of predetermined widths, and means for storing the severed strips and at the same time interposing a protecting-strip between the plies thereof.

8. In a machine of the class described, the combination with means for feeding a sheet of fabric therethrough, of cutting mechanism and a hammer operating conjointly therewith, the cutting mechanism being disposed to cut the fabric on the bias, an apron arranged beneath the hammer and operating to hold the rear end of a preceding blank elevated above the table to permit a succeeding blank to pass thereunder to form a lap, and means for releasing the apron and the hammer to cause adhesion between the blanks.

9. In a machine of the class described, a hammer and knife carrying frame, the knife being disposed at an angle to the hammer, and means for feeding the strip of fabric beneath the frame.

In testimony whereof we have hereunto set our hands in presence of two subscribing witnesses.

FRANK A. SEIBERLING.
UZZIEL P. SMITH.

Witnesses:
   GEO. W. ROGERS,
   H. A. TOWNSLEY.